Nov. 3, 1964 H. KUMMERMAN 3,155,068
METHOD AND MEANS FOR CLOSING AND LOCKING MOVABLE PANELS
AND RETRACTABLE BEARING MEMBERS, NOTABLY
FOR SHEDS, SHIPHOLDS AND THE LIKE
Filed Feb. 20, 1962 10 Sheets-Sheet 3
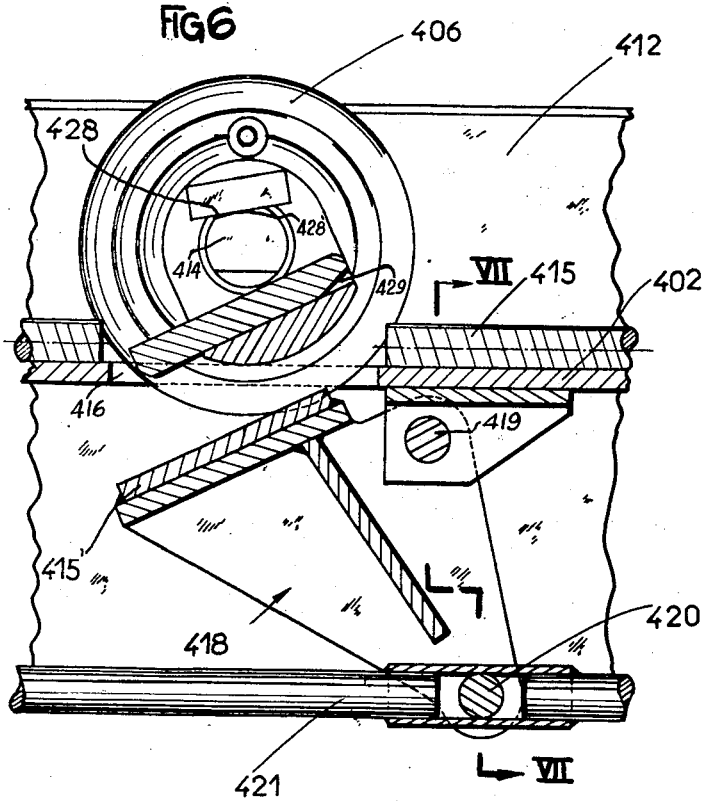
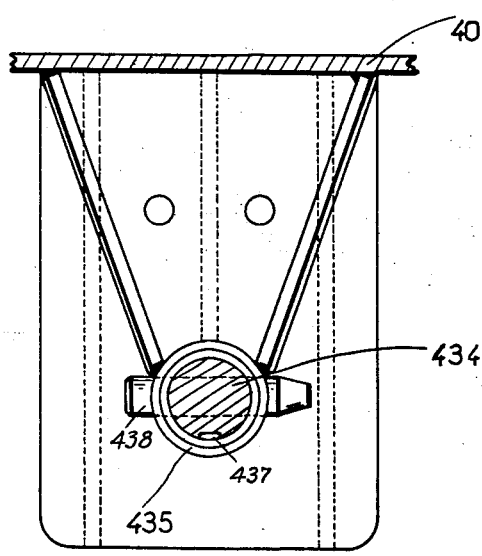
INVENTOR
HENRI KUMMERMAN
BY
Kenyon & Kenyon
ATTORNEYS

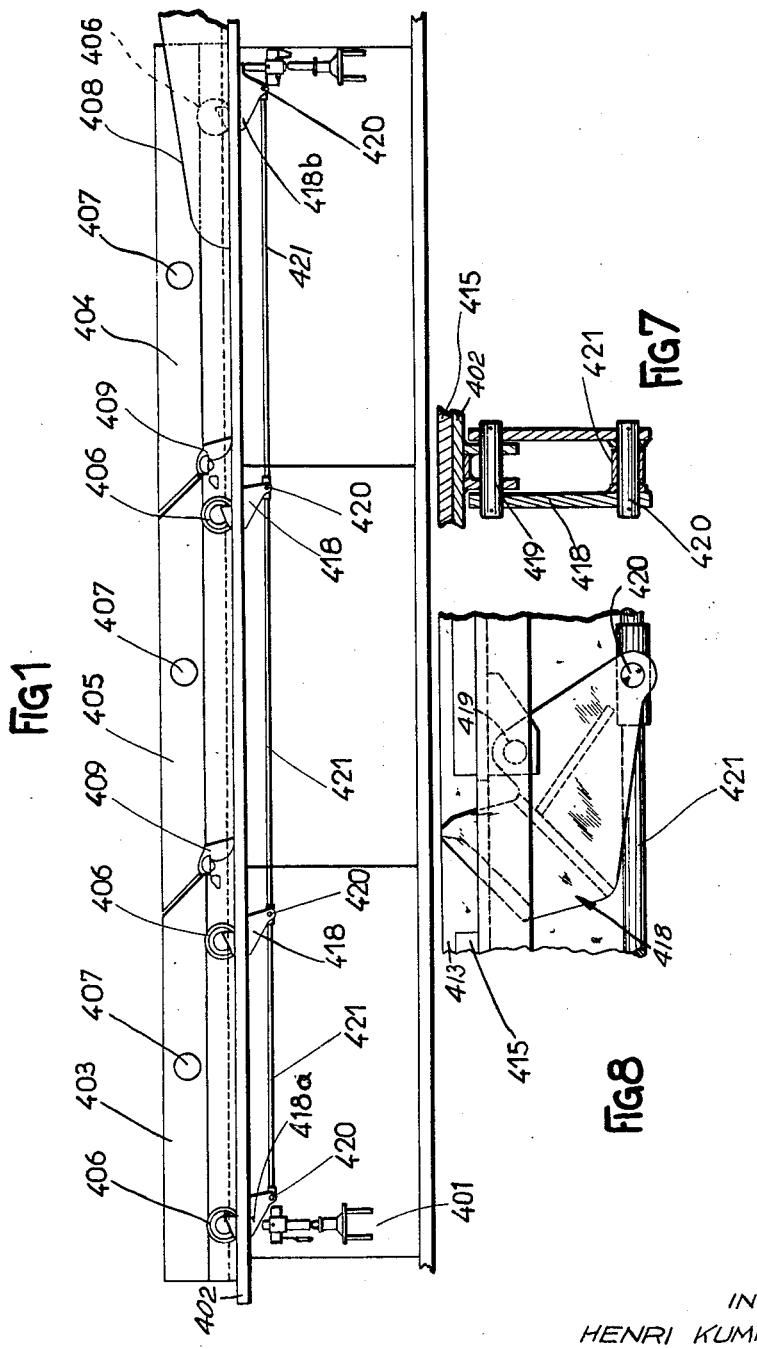

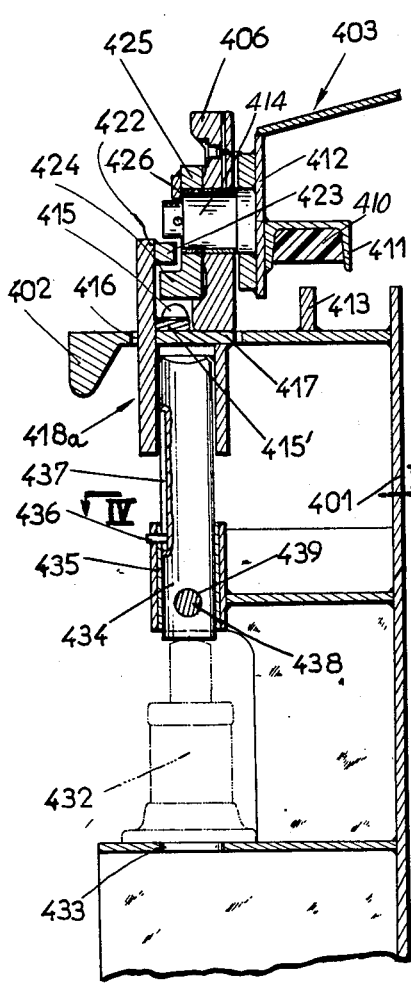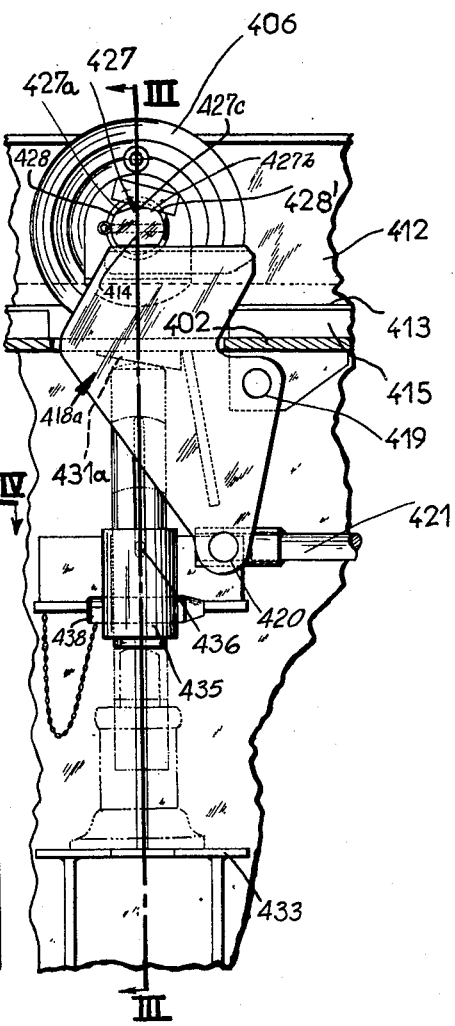

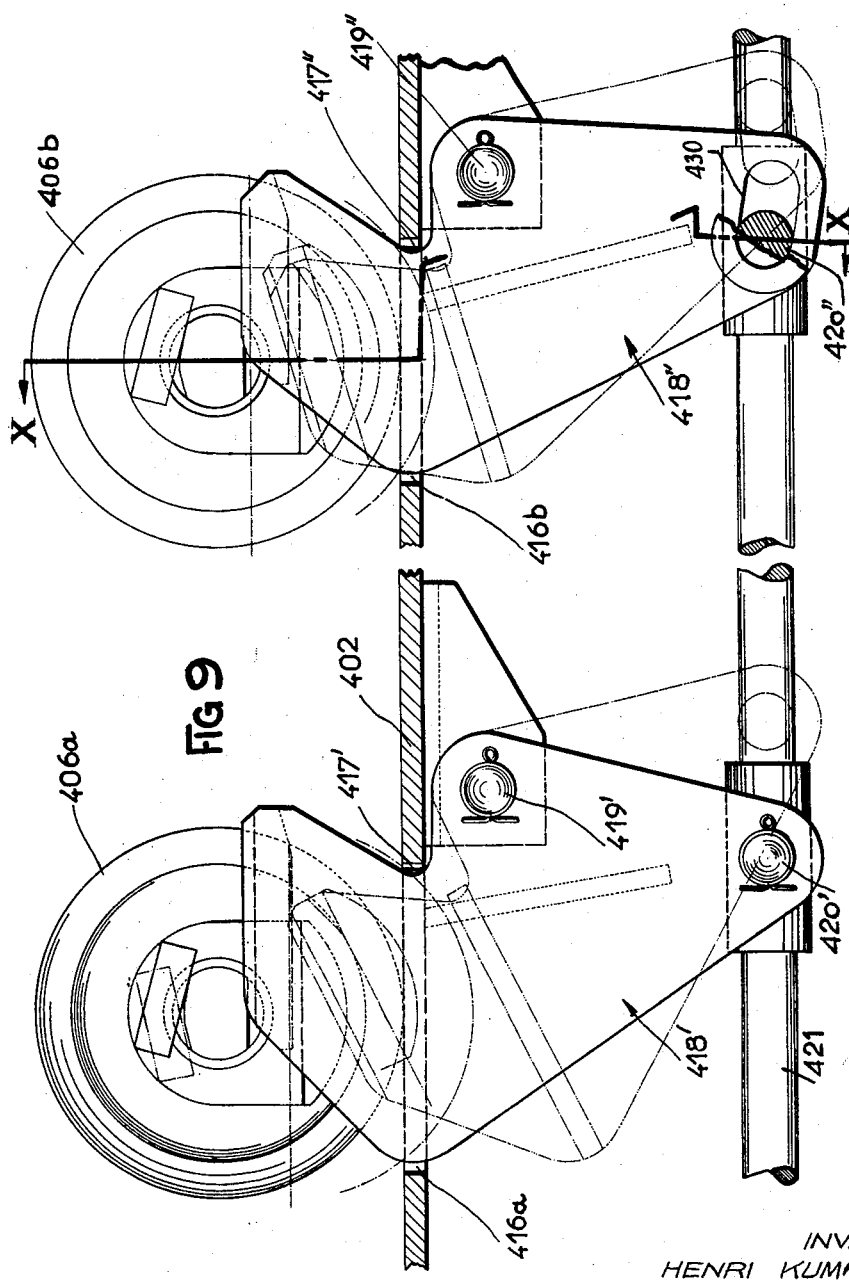

Nov. 3, 1964 H. KUMMERMAN 3,155,068
METHOD AND MEANS FOR CLOSING AND LOCKING MOVABLE PANELS
AND RETRACTABLE BEARING MEMBERS, NOTABLY
FOR SHEDS, SHIPHOLDS AND THE LIKE
Filed Feb. 20, 1962 10 Sheets-Sheet 6
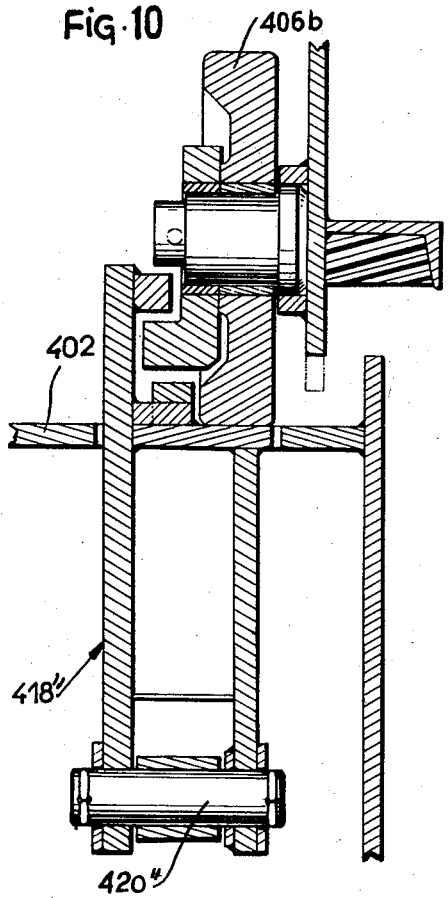
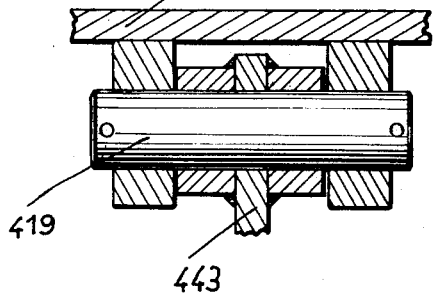
INVENTOR
HENRI KUMMERMAN
BY
ATTORNEYS

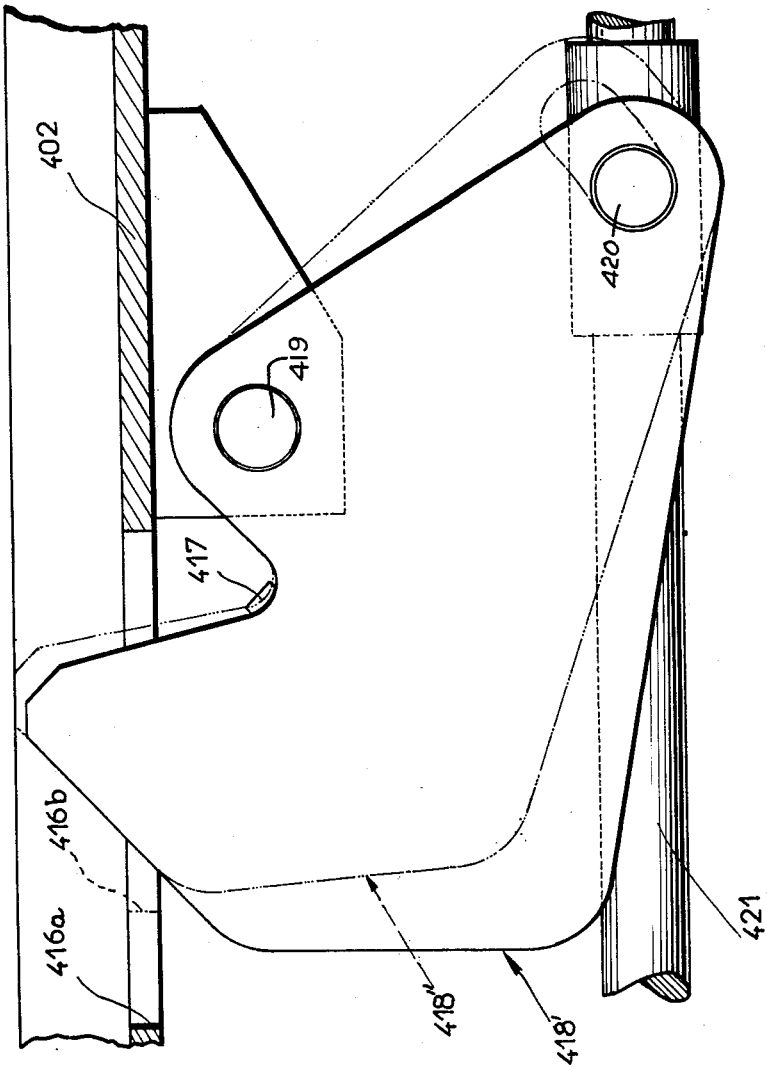

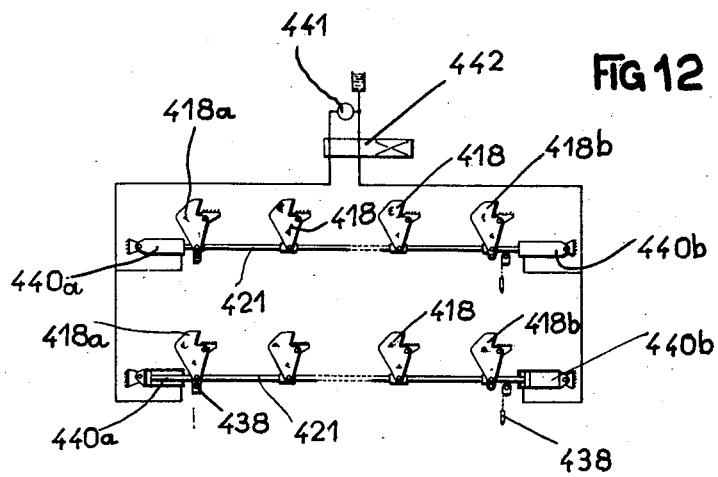
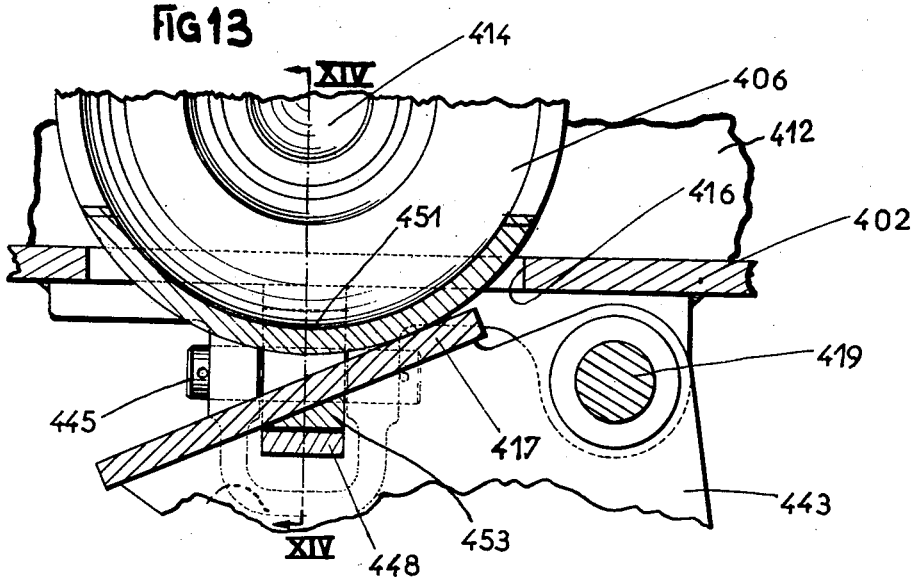

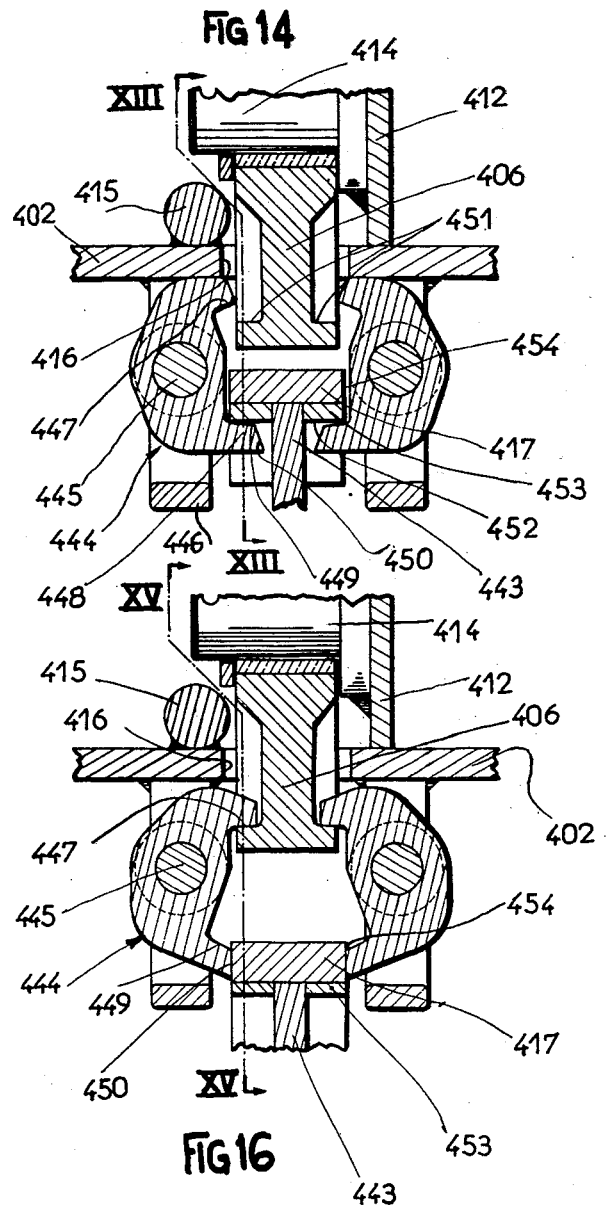

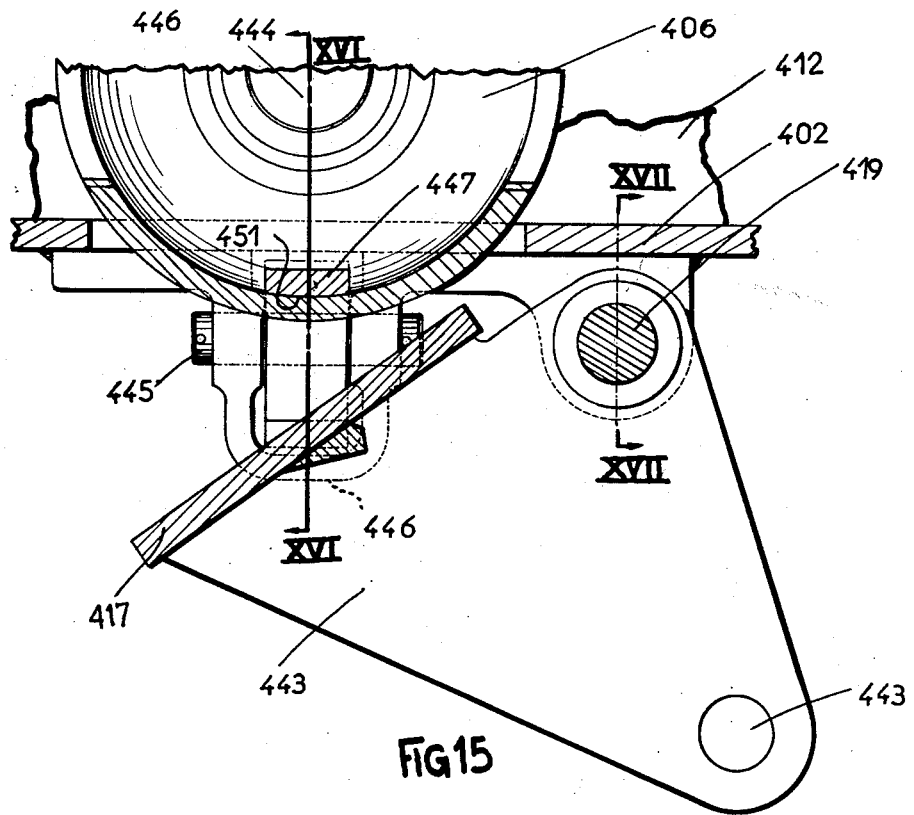

3,155,068
METHOD AND MEANS FOR CLOSING AND LOCKING MOVABLE PANELS AND RETRACTABLE BEARING MEMBERS, NOTABLY FOR SHEDS, SHIPHOLDS AND THE LIKE

Henri Kummerman, Paris, France, assignor to International Mac Gregor Organization (I.M.G.O.), Monte Carlo, Monaco, a corporation of Monaco
Filed Feb. 20, 1962, Ser. No. 174,486
Claims priority, application France Mar. 1, 1961
15 Claims. (Cl. 114—203)

The present invention has essentially for its object a device for closing and locking movable panels and retractable bearing members, notably for sheds, shipholds and the like.

There has been described in U.S. patent applications Ser. No. 73,694 filed on December 5th, 1960, and Ser. No. 85,632 filed on January 30th, 1961, now respectively U.S. Patents Nos. 3,092,065 and 3,090,342, a movable panel assembly for closing fixed or movable outdoor spaces such as sheds, shipholds, rolling vehicles, tanks, etc., this assembly comprising in combination with the bearing members or the control members causing the panels to engage or bear against their seats in the closed position, fastening or locking means adapted to hold said panels in this closed position against motion, said fastening or locking means being responsive to said bearing members or the control members thereof.

More particularly, there is described and illustrated in these patents a device of the type wherein the guideway or runway provided for example along each hatchway coaming, in the case of a shiphold, has openings formed therein to permit the passage of rollers, slip shoes or the like carried by the hatchway panels, and comprises collapsible sections consisting of platforms adapted to either obturate said openings or collapse completely therein beneath the runway, each platform being rigid with a bearing member in the form of an arm pivotally mounted under said runway and pivotally attached on the other hand on a control rod common to all the pivoting arms extending along the same edge of the hatchway coaming, said bearing member comprising a portion associated with said platform and designed to act as a locking means co-acting in the closed and locked condition of said panels with a projection such as a flange, pin or any similar element rigid with the panel concerned. The specific form of embodiment according to this invention is remarkable notably in that said locking means consists of at least one projection such as a flange, boss, lockplate or hook, or any other suitable member, which is either rigid with the aforesaid bearing member and located above said platform or solid with a movable element carried by the hatchway coaming and adapted to co-act by direct contact with said bearing member and actuable as a consequence of the displacement of said bearing member.

According to another feature characterizing this invention, said projection consists of either a protruding portion of a skid or shoe carried by said panel, or the end portion of the shaft carrying said roller if the latter is of relatively small diameter, or the roller rim flange, or the edge of a movable member such as the free flange or ledge of an angle member pivotally mounted on a horizontal pin rigid with the lateral edge of said panel, whereby in the raised position of said platform said ledge may position itself freely under said locking plate at the end of the rolling movement of said panel to its closed position.

It is a further feature of this invention, in the alternate embodiment utilizing an angle member as set forth in the preceding paragraph, to mount said angle member on the shaft carrying said panel roller, preferably on the outer end of this shaft, this angle member comprising in this case means adapted to restrict the angular amplitude of its movement of rotation, said amplitude-limiting means consisting for example of a suitable portion of the angle member which is adapted to engage fixed elements acting as stops for limiting its pivotal movements in either direction.

Other features and advantages of this invention will appear as the following description proceeds with reference to the accompanying drawings, in which:

FIGURE 1 illustrates diagrammatically by way of example in longitudinal elevational view a group of hatchway panel elements in their closed position, these panel elements being equipped with the locking means according to a specific form of embodiment of this invention.

FIGURE 2 is a fragmentary elevational view showing on a larger scale one of the two end locking devices in their raised position, with the unlocking or release control device common to the locking system, the edge of the hatchway coaming plate being cut across the openings in order to afford a clearer understanding of the arrangement;

FIGURE 3 is a diagrammatic section taken upon the line III—III of FIGURE 2;

FIGURE 4 is another diagrammatic section taken on a smaller scale upon the line IV—IV of FIGURE 3;

FIGURE 6 illustrates diagrammatically in longitudinal elevation an intermediate locking device in its locked condition, with a section taken upon a vertical broken plane coincident with the longitudinal axis of the control rod common to the locking system;

FIGURE 7 is a diagrammatic section taken upon the broken line VII—VII of FIGURE 6;

FIGURE 8 is a diagrammatic elevational view showing an intermediate locking device in its retracted position;

FIGURE 9 is a diagrammatic longitudinal elevational view showing the devices for locking the two rollers having different downward strokes on the same side of a panel equipped with two pairs of rollers;

FIGURE 10 is a diagrammatic cross-sectional view taken upon the line X—X of FIGURE 9;

FIGURE 11 is a diagrammatic longitudinal elevational view showing two superposed locking devices of the type shown in FIGURE 9, in their retracted position;

FIGURE 12 illustrates diagrammatically a hydraulic control system for operating the locking devices;

FIGURE 13 illustrates diagrammatically in section taken upon the line XIII—XIII of FIGURE 14 and in elevational longitudinal view another form of embodiment comprising a claw-type locking device in its released position;

FIGURE 14 illustrates diagrammatically a section taken upon the line XIV—XIV of FIGURE 13;

FIGURE 15 is another diagrammatic section taken upon the line XV—XV of FIGURE 16, showing in longitudinal elevation the claw device in its locked position;

FIGURE 16 illustrates diagrammatically a section taken upon the line XVI—XVI of FIGURE 15, and FIGURE 17 is a fragmentary section upon the line XVII—XVII of FIGURE 16.

Figure 5:
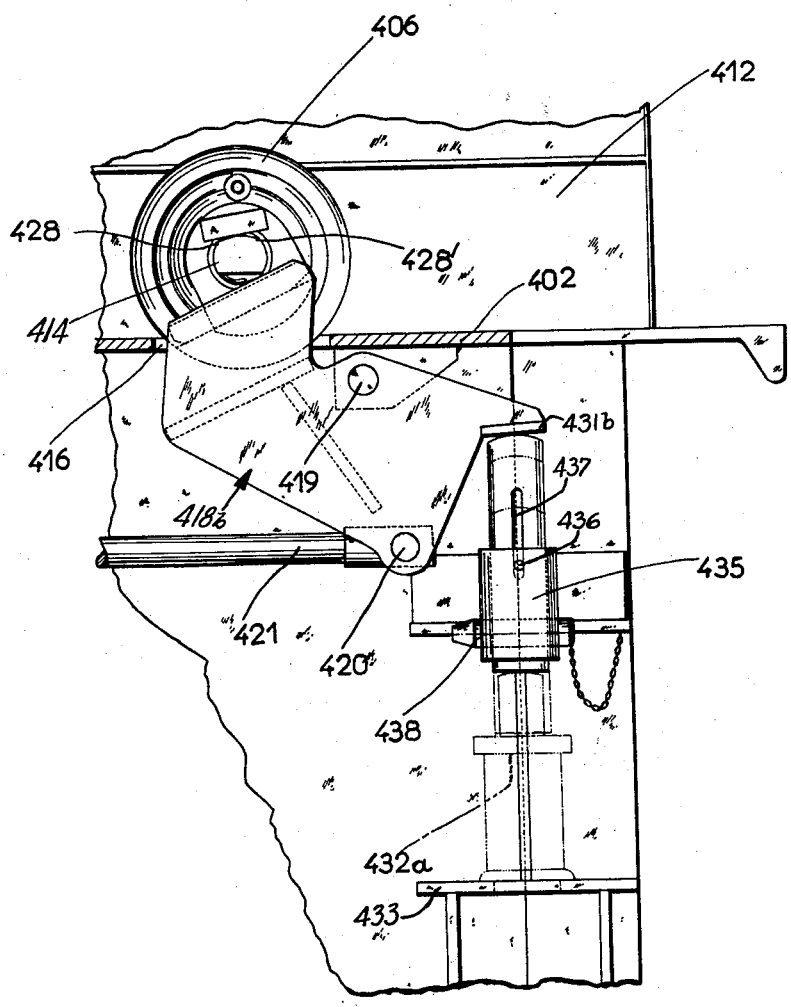
FIGURE 5 illustrates diagrammatically in elevation the other end locking device in its locked condition with the locking control means common to the locking system.

According to the first form of embodiment illustrated in the drawings the reference numeral 401 designates a shiphold hatchway as viewed along its longitudinal coaming, this hatchway being provided with a coaming plate 402 adapted to support the hatchway panels constituting in general a multiple element or a multiple section cover structure, for example of three elements or sections, that is, two end panels 403 and 404 and an intermediate panel 405. These hatchway panels are advantageously of the well-known type adapted to be stowed substantially vertically in a suitable space provided at one end as seen in FIGURE 1. To this end, the hatchway panels are provided on the one hand with slip shoes or preferably rollers 406 whereby they can roll on runways or guideways formed along the coaming plates 402, and on the other hand with at least one pair of lateral tilting rollers 407 adapted, during the stowing of the hatchway panels, to co-act with side ramps 408 extending along the end portions of the hatchway coaming on the side of the stowage space. According to a known arrangement, the end panel 403 adapted to cover the hatchway end portion opposite the stowage space is provided with two pairs of lateral rollers 406 and the other panels such as 404 and 405 may include only one pair of rollers 406 located near the so-called rear end of the panel, that is, the end adjacent to the stowage space, the other or so-called front end of the panel being supported by the rear end of the adjacent panel preceding it, the two adjacent ends of two successive panels contacting each other and causing one panel to tilt on the rear end of the preceding panel already in its hatchway-closing horizontal position. The assembly of the two adjacent ends of a pair of successive panels is facilitated by the provision of a cam guiding system 409 along the lateral faces of each panel.

As shown more particularly in FIGURE 3, the joint is sealed against the ingress of rain or seawater according to the conventional arrangement consisting in compressing a sealing gasket 410 rigidly connected to the side face 412 of the hatchway panel. This compression results from the lowering of the hatchway panel to its closed position until the sealing gasket 410 tightly engages a continuous strip or projecting edge consisting for example of the upper edge of a flat iron 413 disposed vertically and secured on the coaming plate, the gasket being clamped jointly by the weight of the hatchway panel and by the locking system, the compression effort applied to the gasket being however limited by the positive engagement of the lower edge of the lateral plate 412 with the coaming plate 402. FIGURE 3 also shows a typical mounting of a roller 406 on a hatchway panel such as 403. The roller 406 is rotatably mounted on a fixed pin 414. Each coaming plate 402 comprises a longitudinal projecting strip or ledge 415 secured for example by welding and adapted to limit the runway for guiding the rollers 406 laterally. According to a known arrangement, each coaming plate 402 comprises in the plane of each roller 406, in the position attained by the relevant panel at the end of its closing movement, an opening 416 adapted to be obturated and engageable by the relevant roller 406 in order to lower the hatchway panel and cause the sealing gasket 410 to engage its underlying seat or strip 413. In the raised position of the hatchway panel the opening 416 is closed by a movable platform 417 constituting a collapsible section of the runway, that is, of the coaming plate in the case just contemplated. Each platform 417 is rigid with a lever-like bearing member in the form of a bracket lever or support 418 fulcrumed on the one hand on a fixed pin 419 disposed preferably beneath the coaming plate 402. The support 418 is also pivotally attached to a pin 420 carried by a control rod 421 common to all the bearing members 418 which are thus operatively interconnected. By actuating this control rod from one or the other end the brackets 418 are pivoted to any desired intermediate position between the vertical raised or release position shown in FIGURE 2 and the oblique retracted position shown in FIGURE 8.

Thus, two successive bearing members 418 constitute with the section of control rod 421 interconnecting them a parallel-motion system, and the complete series of members 418 on one side of the hatchway can easily be controlled by actuating the control rod 421 from one or the other end of the hatchway. Thus, for example, the operator may simply actuate one of the end brackets 418 and all the other brackets associated therewith will perform the same angular movements. At the end of the hatchway panel closing movement all the rollers or wheels 406 overlie the relevant openings 416 formed in the runways which are normally closed by the platforms 417 in their upper position, that is, level with the corresponding runway. In the locking position these platforms 417 pivot about the pivot pin 419 to free the opening 416 in which the panel roller 406 is lowered, thus causing the panel to be lowered and seated on the hatch-coaming plate while compressing the sealing gasket 410 on its seat 413. A specific form of embodiment of the bearing member or bracket 418 is illustrated in FIGURES 2, 3, 6, 7 and 10. The lateral guide ledge 415 is broken by the openings 416, but a corresponding ledge portion 415' provided on each platform 417 fills the gap. The bracket 418 is formed with an outer flange or cheek 422 having secured on its inner face the platform 417 extending at right angles thereto. This flange extends upwards beyond the platform 417 and carries along its upper edge an inner projection or ledge 423 consisting for example of a strip secured at right angles thereto and parallel to the aforesaid platform 417. This strip 423 constituting the locking strip of the device is adapted in the lower position of the hatchway panel to co-act with a projection consisting of a flange, pin or the like rigid with the lateral face of the panel for holding the latter against movement in its lower position and thus assist in compressing the sealing gasket 410 on its seat or companion strip 413. According to a preferred embodiment said projection engageable by the strip 423 for locking purposes consists of a ledge or flange 424 of a movable angle member 425 pivotally mounted through its vertical web or longer flange on the end portion of the pin 414 carrying the relevant roller 406. The upper end of this angle member 425 is formed with a key-forming insert 426 consisting for example of a flat iron adapted to limit the amplitude of the angular movement of the angle member 425 about the axis of pin 414. To this end, the lower flat face of key 426 is in close proximity of a geometrical singularity or accident formed in the lateral surface, provided on the end portion of the fixed pin 414, such as an eccentric peripheral surface portion 427 limited by a pair of edges 428, 428' by which it is connected to the normal cylindrical surface of this pin 414. The edges 428, 428' will thus limit by positive stop engagement the displacement of the aforesaid key 426 and therefore the rotation of the angle member 425 in either direction. The eccentric peripheral surface 427 may advantageously consist of two extreme flat faces 427a, 427b connected tangentially by an intermediate part-cylindrical surface portion 427c. To facilitate the machining of these parts the intermediate portion 427c may also consist, preferably, of a flat face so that the surface portion 427 will consist of a prismatic surface having three flat faces. Under these conditions, to permit a limited displacement of the key, the distance from the lower face thereof to the center line of pin 414 should be greater than the radial distance to an intermediate edge but lower than that of an extreme edge 428 or 428'. The arrangement of the end flat faces 427a and 427b should be such that the angle of permissible movement of the angle member 425 as limited by the key 426 be at least equal and preferably greater than the permissible angular movement of the bearing member 418 between its uppermost or raised position (FIGURE 2) and its locked position (FIGURE 6). In the vertical raised position of the bearing member 418 (FIGURES 2 and 3) there is a relative engagement between the runway platform 417 and the roller 406, and a clearance between the lower face of the locking plate 423 and the upper face of the ledge 424 of angle member 425. Conversely, in the locked position (FIGURES 5 and 6) there is a clearance between the runway platform 417 and the roller 406, and a contact between the locking plate 423 and the pivoting ledge 424. In the raised position of member 418 (FIGURES 2 and 3) during the rolling movement of the hatchway panel the ledge 424 should pass freely beneath the horizontal locking plate 423, but if the angle member 425 is rotatably driven through frictional engagement with the roller 406, the key 426 limits the rotation of this angle member 425 in order to keep the ledge 424 either horizontal in one direction of movement of the hatchway panel (that is, in the hatchway opening movement) or deviated to the maximum permissible angle of rotation in the opposite direction of movement of the panel (hatchway closing movement). This permissible angular movement is so selected that the ledge 424 of angle member 425 may be restored to the horizontal during its engagement with the locking plate 423, the latter being formed to this end with an inclined ramp or cam face 429 (FIGURE 6).

If the diameter of the rollers 406 is relatively small, the pivoting angle member 425 can be dispensed with and the locking action effected by direct engagement of the locking plate 423 with the end of the pin 414 on which the rollers are mounted. Similarly, if the hatchway panels are provided with slip shoes instead of rollers, each panel can be locked directly on these shoes by adequately shaping the upper portion thereof.

If the complete set of panels or panel elements are equipped respectively with two pairs of rollers or wheels, or slip shoes, preferably of same dimensions, it may be advantageous to have one pair of rollers or shoes so mounted that their panel lowering or raising stroke differs from that of the companion pair. This may be desirable notably for facilitating the transverse weather-tight assembly or the separation of an intermediate panel from the preceding and following adjacent panels, notably when each panel comprises along one of its transverse sides a ledge or strip adapted to constitute the seat of a sealing gasket carried by the contiguous transverse side of one of said adjacent panels, and along its opposite transverse side a sealing gasket adapted to engage the corresponding sealing ledge or strip rigid with the adjacent transverse side of the other adjacent panel. On a same panel, the pair of rollers or shoes having the smallest vertical stroke is located under these conditions on the transverse side provided with the sealing ledge, the other pair of rollers located on the opposite transverse side carrying the sealing gasket. In order to ensure a proper engagement of the longitudinal gaskets 410 with their seats 413 on the coaming plate 402 and subsequently preserve the horizontal position of these panels in their lowered position, in spite of the difference in the vertical stroke of the two pairs of rollers or shoes of each panel, these rollers or shoes are not disposed at the same level on the panel; in relation to the panel, the pair of rollers performing the shortest stroke is located at a higher level than the pair of rollers performing the longest stroke, whereby the panel, which is substantially horizontal or parallel to the coaming plate 402 in the lower position, is somewhat inclined in its raised position. As a result of this difference in the vertical strokes when the movement of vertical translation is imparted to the panel the latter is somewhat tilted or rotated, whereby the transverse side thereof carrying the sealing gasket is lowered, and the opposite transverse side carrying the sealing strip is raised in relation thereto, thus facilitating the separation of the panel concerned from the adjacent panels.

FIGURE 9 illustrates the two rollers 406a and 406b located on the same side of a panel of this type. The roller 406a accomplishes a longer vertical stroke than the roller 406b.

As these rollers 406a and 406b are identical, the difference in their strokes determines a different depth of engagement of these rollers in the openings 416 formed in the runway 402. Therefore, the opening 416a engaged by the roller 406a having a longer stroke must have a greater length than the opening 416b engaged by the roller 406b performing the shorter stroke, since in the raised position these rollers lie in the same plane.

In the specific case of this intermediate panel, the respective brackets, bearing members or levers 418' of rollers 406a and 418'' of roller 406b differ somewhat to permit their simultaneous operation through the interconnecting control rod 421. Bracket 418'' is formed at its pivotal mounting on pin 420'' with an arcuate slot or circular ring section 430 centered on the axis of the fixed pivot pin 419'' by which the bracket is pivotally mounted on the hatchway coaming.

The pivot pin 420'' rigid with the control rod 421 is adapted in the endmost positions of this rod which correspond to the raised and locked panel positions respectively to engage the corresponding ends of this slot 430. The operative length of the mean arc of slot 430 which corresponds to the relative movement of pin 420'' along this slot is determined by the difference between the angular amplitude of the movement of bracket 418' associated with the long-stroke roller 406a and that of bracket 418'' associated with the short-stroke roller 406b, between their raised position (shown in thick lines in FIGURE 9) and their locked position (shown in chain lines in FIGURE 9). During the bracket retracting movements taking place after the hatchway opening operation (the panels being stowed in the stowage space) the bracket 418'' of the short-stroke roller 406b rotates through an angle equal to the mean operative arc of slot 430 and will thus occupy a position similar to that of bracket 418' of the long-stroke roller 406a, as shown in FIGURE 11 wherein the two brackets 418' and 418'' are superposed intentionally in the retracted position to facilitate the comparison.

The common control rod 421 may be actuated from any suitable translation apparatus (pneumatic, hydraulic, electrical or mechanical winch, ram or jack, or any adequate rotary machine incorporating a reduction gearing). In order to avoid applying any compression stress to the interconnecting rod 421, this rod is pulled in one and the other direction by acting upon one of the endmost brackets or bearing members, for example member 418a for raising or releasing the panels and on the other member 418b for locking the panel assembly. In the case illustrated in FIGURES 1 and 12, a single cylinder provides one of the two raising or locking actions. To this end, according to the form of embodiment illustrated in FIGURES 1, 2, 3 and 5, each endmost bracket or bearing member 418a or 418b is formed with a stop-forming bearing face 431a or 431b adapted to be engaged by said control member (for example the hand-actuated hydraulic jack 432) if desired through the medium of a transmission or like member. In the example illustrated the jack 432 is mounted on a fixed support 433 and acts through its piston rod upon one end of a push-rod or like member 434 slidably mounted in a fixed bearing constituting a sleeve or socket 435, the other end of this push-rod actuating the bracket or bearing member 418a or 418b by abutting against the bearing surface 431a or 431b. The stroke of push-rod 434 is limited by means of a fixed stud or pin 436 engaging a longitudinal slot 437 formed in the push-rod 434. Means are provided for locking the brackets, bearing members or levers on a same side of the aforesaid hatchway or like opening, respectively in the raised position or in the locked position, for example by locking the extreme bracket. These locking means may consist of each one of the two extreme bearing members of a same, common control rod, a pin or like member, adapted to be inserted through corresponding holes in said brackets or lever (or a part rigid therewith) and in a fixed support, when these holes are in relative alignment, one end bracket being adapted to be locked only in its raised position, while the other end bracket is adapted to be locked only in its lower panel locking position. Thus, the bearing members 418 are locked in their raised position as a consequence of the locking action exerted on the push-rod 434 associated with the extreme bearing member 418a in its upper position, by means of a pin 438 engaging aligned holes formed in the fixed bearing 435 and in the movable push-rod 434. The bearing members 418 are similarly locked in their locking position by holding against motion the push-rod 434 of the extreme bearing member 418b by means of a pin 438. In the raised position, when the bearing member 418a is locked by the insertion of the relevant pin the runway provides a continuous surface along the coaming.

FIGURE 12 illustrates an alternate embodiment of the hydraulic means controlling the locking system along the two longitudinal sides of the space or hatchway, wherein the control means consist of four hydraulic jacks or cylinders, namely two lifting cylinders 440a hydraulically interconnected, and two locking cylinders 440b also coupled hydraulically. These cylinders operate respectively by directly pulling the relevant end of the respective control rods 421. A hand-actuated or power-operated pump 441 supplies hydraulic fluid to these cylinders by pairs under the control of a two-position distributor 442.

The means for operating the two end hatchway panels such as 403 or 404 on the hatchway breast-beam are not shown, but they may consist of hooks or like members extending through the breast-beam plate, these members being pivotally mounted like the bearing members or brackets described hereinabove.

These hooks are actuated simultaneously from an interconnecting rod pulled in turn from one or the other side either through a separate control member or through the main control system by means of a bell-crank lever operatively connecting the transverse coupling rod to the longitudinal coupling rod. These hooks are adapted to engage studs or like projections rigid with the end panel and their movements take place in a direction opposite to that of the bearing members 418; under these conditions, in the locking position the hook arms extend vertically whereas the bearing members are inclined, and in the raised position the hook arms are inclined and collapse beneath the hatchway breast-beam plate, whereas the bearing members extend vertically.

When the panels are stowed vertically in their stowage space at one end of the hatchway, the bearing members 418 are retracted completely beneath the sealing strip or seat 413 in order to avoid any projection likely to impair the loading and unloading operations (see notably FIGURES 8 and 11). To this end, the operator simply actuates the coupling rod 421 until its stroke is completed, in order to overstep the locking position.

The operation of this device is particularly simple. When the hatchway is open, that is, when the hatchway cover panel sections are stowed in their stowage space, the control rod 421 is pulled to move the bearing members from their retracted position illustrated in FIGURE 8 to their vertical raised position illustrated in FIGURES 2 or 9. The hatchway panels are moved to their closed position by causing them to roll along the hatchway coaming until their closing movement is completed. Under these conditions, each roller or wheel 406 will be supported by a retractable platform 417 obturating an opening 416. During the rolling movement the ledges 424 tend to move in the counter-clockwise direction due to their frictional engagement with the rollers 406, but this angular movement is limited by the presence of the key 426 and therefore they simply assume an inclined position and thus engage the locking plate or strip 423 which, due to the provision of the ramp or cam face 429, restores them to a horizontal position. By actuating the cylinders 432b or 440b acting upon the endmost bearing member 418b, the complete set of bearing members or brackets 418 pivots to an inclined position as shown in FIGURES 5 and 6. Under these conditions, each platform 417 is retracted beneath the runway, the rollers penetrating into the openings 416 so that the hatchway panels are lowered and their sealing gaskets 410 caused to engage the underlying seat 413; at the same time, the locking plate 423 co-acting with the pivoting ledge 424 holds the panels against motion by exerting an oblique upward pressure, thus assisting in clamping the sealing gasket 410 on its seat 413. The unlocking, lifting and opening steps constitute the same sequence of operations as described hereinabove, but in the reverse order.

FIGURES 13 to 17 illustrate another form of embodiment wherein the aforesaid locking means associated with the bearing member or bracket consists of at least one and preferably two movable claws, hooks or like members disposed beneath the runway and registering with each other and with the relevant opening 416 formed in the runway; these claws are adapted to pivot in a vertical plane for engaging, under the influence of said bearing member, the flange or bead of the roller or wheel in its lower position. The design of this bearing member 443 is considerably simplified in this modified embodiment, since it may consist simply of a sheet-metal plate supporting the platform 417, as shown in FIGURES 15 and 17. Two movable locking claws 444 are pivotally mounted on a horizontal pin 445 carried by a bearing or strap 446 preferably secured by welding on the underface of the hatch-coaming plate 402 on either side of the opening 416 formed in said plate. Each claw is preferably in the form of a pivoting lever of which the upper arm or portion constitutes the claw 447 proper, the lower arm 448 of this lever being formed with a heel engageable by the bearing member or bracket 443 and preferably by the platform 417. To this end the heel 448 is formed with an inclined lower face 449 ending with a bevel 450. To prevent the lever 444 from tilting completely, the claw 447 is adapted to engage the lower face of the coaming plate 402, as shown in FIGURE 14. In the released position of lever 444 this claw 447 is raised and the heel 448 engages the underface of platform 417 rigid with the bracket 443 (see FIGURE 14).

The claw 447 is adapted when tilted to engage the bead or flange 451 of the rim of the roller 406. The inclined face 449 is adapted to engage the lower face of platform 417. To this end, this lower bearing face comprises a contact face 452 so disposed as to be substantially horizontal when it engages the inclined face 449 of heel 448. This face 452 is obtained for example by providing a boss or insert 453 welded or otherwise secured on the platform 417.

This device operates as follows:

When the platform 417 is raised—that is, when its upper face is flush with the runway—so that the roller 406 is supported by this platform, both levers 444 are in a nearly vertical position; their claws 447 are normally retracted beneath the coaming plate and engage the underface thereof. When the platform 417 is lowered as a consequence of the rotation of the bearing member 443 about its axis 419 the roller 406 is also lowered through the opening 416 in the coaming plate 402, and as the claws 447 are moved aside they allow the rim of said roller to pass therebetween. When the roller is stopped by the fact that the hatchway panel has completed its downward stroke by gravity, platform 417 contacts through its face 453 the face 449 of the two heels 448, and due to the oblique reaction thus applied to the face 449 the two heels 448 are driven laterally away from each other until their ends 450 abut against the side face 454 of platform 417. During this movement the lever 444 is tilted and the claws 447 thereof engage and retain the bead or flange 451 of the rim of wheel or roller 406, by positioning themselves above said bead or flange. From this moment on, the roller and therefore the panel associated therewith is locked, since the lever 444 is prevented from rotating in one direction by the engagement of claws 447 against the rim 451 of roller 406 and in the other direction by the engagement of heels 448 against the side faces 454 of platform 417. When the rollers 406 move upwards, platform 417 rises until it engages the corresponding roller 406. During this movement the platform escapes from the lateral holding contact of heels 448 and when the rim 451 of roller 406 lifts in turn the claws 447, the latter are moved away from each other by the tilting movement of levers 444, and the roller is thus released.

This system is characterized by the following advantages:

It is fully protected beneath the coaming plate and has no part projecting above this plate;

Its operation requires only a tractive effort applied to the bearing members 443, since the panels are lowered by gravity alone.

However, in this system the weight of the panels must be sufficient to apply a convenient pressure on the sealing gaskets provided between the panels and the edges of the hatchway coaming.

Of course, this invention should not be construed as being limited to the forms of embodiment shown and described by way of example, as many modifications and variations may be brought thereto without departing from the spirit and scope of the invention.

What I claim is:

1. A movable closing arrangement comprising multiple cover panels for a hatch-like top aperture of an enclosed space, panel runways provided along edges of said aperture, sealing means adjacent said runways onto which said panels may be lowered for effecting sealing joints and from which they may be lifted to open the sealing joints, said panels having rollers movable over said runways and said runways being formed with orifices into which said rollers may descend for lowering of the panels, pivoted double armed bell-crank lever members fulcrumed intermediate the arms thereof beneath said runways, one arm of each one of said lever members being formed with a platform-like surface movable upwards and downwards in one of said orifices and engageable by one of said rollers for raising and lowering the panels relative to said sealing means, horizontally movable unitary drag link means pivotally connected to the other arms of all said lever members along each one of two opposite sides of said aperture, power control means operatively connected to said drag link means to actuate the latter in opposite directions for moving said lever members in unison, dogging means associated with each one of said lever members, and catch means carried by said rollers respectively and engaged by said dogging means when said panels are in their lowered positions to lock the latter tightly on said sealing means.

2. An arrangement according to claim 1, wherein said dogging means includes locking flange means integral with said lever member and projecting laterally therefrom, wherein said locking flange means overlies in spaced relationship said platform of each one of said lever members, wherein said rollers are each mounted on an axle pin secured outwards to said panels and having a protruding axle pin end, and wherein said catch means consists of a freely swinging angle member pivotally mounted on said axle pin end and provided with a lower flange engaged from above by said locking flange means in the lowered position of the panels.

3. An arrangement according to claim 2 wherein said angle member whose lower flange is engaged from above by said locking flange means is formed with an upper cleat-like keeper element closely overlying the tip of said axle pin end and said tip is formed with an eccentric peripheral surface portion bound by two stop-forming end edges parallel to the axle pin axis, said edges being adapted to be engaged by said keeper element in either angular end position of said angle member about said axle pin to limit the rotational displacement thereof.

4. An arrangement according to claim 3 wherein said eccentric peripheral surface portion includes flat faces forming a substantially prismatic surface, wherein the distance from said keeper element to the axis of said axle pin exceeds the radial distance to an intermediate edge of said prismatic surface and is smaller than the radial distance of said end edges, and wherein said flat faces are so disposed relative to said keeper element that the greatest angular displacement of said angle member is at least equal to that of said locking flange means from the unlocked to the locked position thereof, whereby the lower flange of said angle member is kept in a horizontal position below said axle pin for one direction of rolling movement of said panel and deflected through its greatest permissible angular displacement in the opposite direction.

5. An arrangement according to claim 4, wherein said locking flange means is provided with a flat lower face formed at one end thereof with a sloping ramp-like portion adapted, when being engaged in its raised position by said lower flange of said angle member, to restore same to the horizontal position.

6. An arrangement according to claim 1, wherein at least one panel is provided with two pairs of said rollers having differing vertical lifting and lowering strokes respectively, said orifices corresponding to said rollers having differing sizes and wherein means are provided to compensate for the differences between the vertical strokes of said rollers.

7. An arrangement according to claim 1, wherein at least one panel is provided with two pairs of said rollers having differing vertical lifting and lowering strokes and wherein the pivotal connection between said drag link means and the bell-crank lever member associated with the roller having the shortest vertical stroke consists of an arcuate slot formed in said other arm of said lever member and centered on the fixed pivot axis of said lever member and of a follower pivot pin integral with said drag link means and engaged in said slot, the length of the mean arc of said slot representing the path of said pivot pin in said slot being determined by the difference between the permissible rotation of the lever member for raising the long-stroke roller and that of the lever member for raising said short-stroke roller.

8. An arrangement according to claim 7, wherein said slot is so disposed in said short-stroke roller lever member that during the lever retracting operation, said lever member will tilt by gravity through an angle equal to that of said mean arc to a position similar to that of the long-stroke roller lever member.

9. An arrangement according to claim 1, wherein said dogging means includes movable latch means secured under said runways substantially sidewise of one of said orifices and directly engageable by said lever member for being moved into locking position and wherein said movable latch means consist of a pair of registering opposed rocking clamp levers having an upper arm and a lower arm and respectively pivoted intermediate said arms substantially beneath the opposite edges of one of said orifices for swinging motion in a vertical plane transversely of said runways, and said rollers are formed with a flanged rim, said upper arm of each one of said clamp levers being formed with a claw-like portion adapted to engage, when said clamp lever is tilted inwards relative to said orifice, said flanged rim in the lowered position of said rollers, while said lower arm of each one of said clamp levers is formed with a projecting portion adapted to laterally engage a part of said bell-crank lever member in its lowered position so as to cause said clamp lever to tilt into its roller locking position.

10. An arrangement according to claim 1, where said dogging means includes movable latch means and wherein the platform-like surface carried by said bell-crank lever member is formed with a free underface portion and said movable latch means includes upper and lower armed rocking clamp levers with a projecting portion of the lower arm of each one of said clamp levers formed with a downward slanting ramp-like top face adapted to be slidingly engaged from above by a working free underface portion of said platform-like surface during the downward motion thereof whereby said clamp levers are caused to tilt simultaneously until the free ends of their lower arms bear against the opposite sides of said platform.

11. An arrangement according to claim 10, wherein the working underface portion of said platform is so shaped as to lie substantially horizontally prior to engaging said ramp-like top faces of said clamp levers.

12. An arrangement according to claim 10, wherein said clamp levers are so balanced with respect to their pivots that they are tilted by gravity to their unlocking release position when their lower arm ends leave the opposite sides of said platform-like surface during the upward motion thereof, and stop means are provided to limit the release displacement of said clamp levers.

13. An arrangement according to claim 1, wherein said power control means consist for each one of said two drag link means, of a pair of jacking devices operatively connected to the ends of said drag link means respectively to move the same in opposite directions by only applying pulling forces thereto and, comprising locking means to lock each one of said drag link means in its extreme position wherein said panels are raised.

14. An arrangement according to claim 1, wherein said dogging means include locking flange means and wherein said locking flange means are associated with each one of the two bell-crank lever members located at the ends respectively of a same drag link means and comprising at each such end a fixed substantially vertical sleeve means provided with at least two registering holes in its wall and with a stub-like projecting inwards from said wall, a reciprocable push-rod slidably mounted in said sleeve and formed on the one hand with a longitudinal groove slidingly engaged by said stud for preventing rotation and limiting the stroke of said push-rod and on the other hand with a transverse orifice adapted to come in alignment with said holes in the raised position of said push-rod, and a bolt pin for insertion through said aligned holes and orifice for locking said push-rod in its raised position, said push-rod being operatively engaged at its bottom and by one of said jacking devices and engaging freely by its top end one of said bell-crank-lever members located at the end of said drag link means in such a manner as to cause lifting of said panels when said push-rod is driven upwards.

15. An arrangement according to claim 13, wherein said jacking devices comprise hydraulically-actuated, single-acting rams and also comprising a source of pressure fluid connected to said rams in parallel for feeding the same, and a two-position distributor inserted between said source of pressure fluid and said rams.

References Cited in the file of this patent

UNITED STATES PATENTS

| 2,771,136 | Lacomte | Nov. 20, 1956 |
| 3,090,342 | Kummerman et al. | May 21, 1963 |
| 3,092,065 | Kummerman | June 4, 1963 |

FOREIGN PATENTS

| 1,022,796 | France | Dec. 17, 1952 |